(12) United States Patent
Hölscher et al.

(10) Patent No.: US 11,961,163 B2
(45) Date of Patent: Apr. 16, 2024

(54) RECONSTRUCTION MODULE AND METHOD FOR RECONSTRUCTION OF MEDICAL IMAGES

(71) Applicant: Siemens Healthcare GmbH, Erlangen (DE)

(72) Inventors: Uvo Hölscher, Erlangen (DE); Ralf Kartäusch, Bubenreuth (DE)

(73) Assignee: Siemens Healthineers AG, Erlangen (DE)

( * ) Notice: Subject to any disclaimer, the term of this patent is extended or adjusted under 35 U.S.C. 154(b) by 259 days.

(21) Appl. No.: 17/342,890

(22) Filed: Jun. 9, 2021

(65) Prior Publication Data

US 2021/0383581 A1 Dec. 9, 2021

(30) Foreign Application Priority Data

Jun. 9, 2020 (DE) .................... 102020207210.8

(51) Int. Cl.
| | |
|---|---|
| *G06K 9/00* | (2022.01) |
| *G06N 7/00* | (2023.01) |
| *G06T 5/00* | (2006.01) |
| *G06T 11/00* | (2006.01) |

(52) U.S. Cl.
CPC .............. *G06T 11/003* (2013.01); *G06N 7/00* (2013.01); *G06T 5/002* (2013.01); *G06T 2207/10088* (2013.01); *G06T 2207/20192* (2013.01); *G06T 2211/424* (2013.01)

(58) Field of Classification Search
CPC .................. G06T 11/003; G06T 5/002; G06T 2207/10088; G06T 2207/20192; G06T 2211/424; G06N 7/00; G06N 3/045; G06N 3/08; G06N 5/01; G06N 20/20
See application file for complete search history.

(56) References Cited

U.S. PATENT DOCUMENTS

| | | | | |
|---|---|---|---|---|
| 4,973,111 | A * | 11/1990 | Haacke | G01R 33/56 |
| | | | | 324/309 |
| 9,498,177 | B2 * | 11/2016 | Bruder | A61B 6/4014 |
| 10,740,877 | B2 * | 8/2020 | Dey | G06T 11/006 |
| 11,315,221 | B2 * | 4/2022 | Matsuura | G06V 10/454 |

(Continued)

OTHER PUBLICATIONS

Sebastian et al., "Compressed sensing reconstruction of 7 Tesla 23Na multi-channel breast data using 1H MRI constraint," Magnetic Resonance Imaging, vol. 60, pp. 145-156 (2019).

(Continued)

*Primary Examiner* — Shervin K Nakhjavan
(74) *Attorney, Agent, or Firm* — Banner & Witcoff Ltd.

(57) ABSTRACT

A reconstruction module may include at least one parameter interface to receive a set of measurement sequence parameters and a memory interface to a memory having a trained mathematical model stored in the memory. The trained mathematical model determines a results dataset containing at least one iterative denoising parameter and at least one edge enhancement parameter for at least one received measurement sequence parameter. A control of the reconstruction module controls a reconstruction of the medical images using a reconstruction algorithm based on the determined parameters for parameterizing an iterative denoising function and an edge enhancement function.

15 Claims, 6 Drawing Sheets

(56) References Cited

U.S. PATENT DOCUMENTS

| | | | | |
|---|---|---|---|---|
| 2003/0053669 A1* | 3/2003 | Suri | .................... | G06T 7/0012 |
| | | | | 382/130 |
| 2006/0215891 A1* | 9/2006 | Fessler | ................ | G06T 11/005 |
| | | | | 382/128 |
| 2011/0293158 A1* | 12/2011 | Popescu | .............. | G06T 11/006 |
| | | | | 382/266 |
| 2017/0213321 A1* | 7/2017 | Matviychuk | ....... | G06V 10/7715 |
| 2018/0285695 A1* | 10/2018 | Guo | .................... | G06T 11/008 |
| 2019/0104940 A1* | 4/2019 | Zhou | .................. | A61B 5/0035 |
| 2021/0012541 A1* | 1/2021 | Lee | .................... | G06T 11/006 |

OTHER PUBLICATIONS

Bustin et al., "From Compressed-Sensing to Artificial Intelligence-Based Cardiac MRI Reconstruction," Frontiers in Cardiovascular Medicine, vol. 7, Article 17, pp. 1-19 (2020).
Search Report for German Application No. 10 2020 207 219.8 dated Apr. 8, 2021.

* cited by examiner

RECONSTRUCTION MODULE AND METHOD FOR RECONSTRUCTION OF MEDICAL IMAGES

CROSS REFERENCE TO RELATED APPLICATIONS

This patent application claims priority to German Patent Application No. 10 2020 207 210.8, filed Jun. 9, 2020, which is incorporated herein by reference in its entirety.

BACKGROUND

Field

The present disclosure relates to a reconstruction module for a magnetic resonance tomography scanner for the reconstruction of medical images. The present disclosure furthermore comprises a computer-implemented method, a computer program, and a system for the reconstruction of medical images.

Related Art

Magnetic resonance tomography (MRT) as a noninvasive imaging modality assumes special significance in the field of medical diagnostics. MRT enables the visualization of different contrasts resulting from different physical and physiological properties of tissue. As well as strictly anatomical imaging, physiological processes such as the activation of cerebral areas, for example, or also the perfusion of tissue can also be acquired.

Efforts in development are concentrated on the acquisition of images of the body regions to be examined and/or of physiological processes at higher and higher spatial and temporal resolutions. A further focus of development is to increase the speed of the measurement scan, which simultaneously affects the resolution of the medical images. It should be taken into consideration in this regard that MRT examinations are constrained by the actual acquisition time. Long acquisition times are subject to a higher susceptibility to disruptive influencing factors, e.g. changes in blood flow rate and in blood volume, but also instances of interference caused quite generally by respiratory motion, heartbeat, and body motion. These effects can be subsumed under the collective heading of interference factors.

The signal-to-noise (S/N) ratio (SNR) is an important metric for image quality in MRT. If the SNR is insufficient, it is no longer possible to distinguish between a useful MR signal and noise in the image. The SNR is dependent among other things on the scanning speed and the resolution. Consequently, the SNR directly limits the ability to increase the scanning speed and resolution of MRT scans. The SNR can be improved by way of methods known in the prior art, which results in a better resolution of the images. However, too low an SNR, and consequently noise in the images, leads to medical images which no longer fulfill all requirements in respect of accurate clinical diagnosability.

The known iterative denoising (ID) method can be used to achieve a noise reduction in medical images. Iterative denoising is a procedure within the scope of reconstruction technology and can be employed for virtually all measurement sequences or measurement protocols and body regions. In iterative denoising, noise is removed in a threshold-based process following a transformation of the MR signal. The noise reduction may lead to a slight smoothing of the medical image, which necessitates the use of a further procedure, specifically an additional edge enhancement (EE) filter to accentuate the edges.

Typically, therefore, the iterative denoising and edge enhancement procedures are applied in combination. Both procedures require a setting of parameters and consequently a combined parameterization is necessary.

Since significantly different requirements in relation to the noise level are imposed depending on region, measurement sequence and medical issue, the parameterization of iterative denoising and edge enhancement is strongly dependent on situation. The parameterization must be chosen for every medical image that is to be generated. This is necessary on account of the fact that very many different types of images can be generated by means of MRT. In other words, different images of the same body region can be generated in which e.g. cases of water retention are shown, or a muscle is clearly recognizable, or the course of veins can be identified on the image. These different image types depicting the same body region may have different gradations of grayscale values with minor changes in contrast. Other images, on the other hand, exhibit very strong contrasts by comparison, for example images with lots of dark background and some areas that are particularly brightly highlighted. In order to take account of the particular circumstances, the iterative denoising as well as the edge enhancement must be adjusted very closely via the parameterization to fit the individual situation.

No methods are known in the prior art which automatically carry out a selection of the parameters and at the same time take into consideration the conditions and requirements of the specific situation. Currently, it is necessary for an operator of a magnetic resonance tomography scanner to select the appropriate parameters for each body region and each contrast manually, i.e. how strong the denoising is to be and how sharply the edges are to be accentuated. As the parameter settings are not subject to any uniform and comprehensible scaling, such as a field of view in millimeters, for example, it is possible for the operator to discover the right and/or desired parameterization for a respective medical image only by time-consuming manual trial and error. Furthermore, an incorrect parameterization can lead to overly strong or overly weak denoising, as a result of which the ability to achieve an accurate clinical diagnosis and the acceptance of the level control data for the magnetic resonance tomography scanner are no longer guaranteed.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
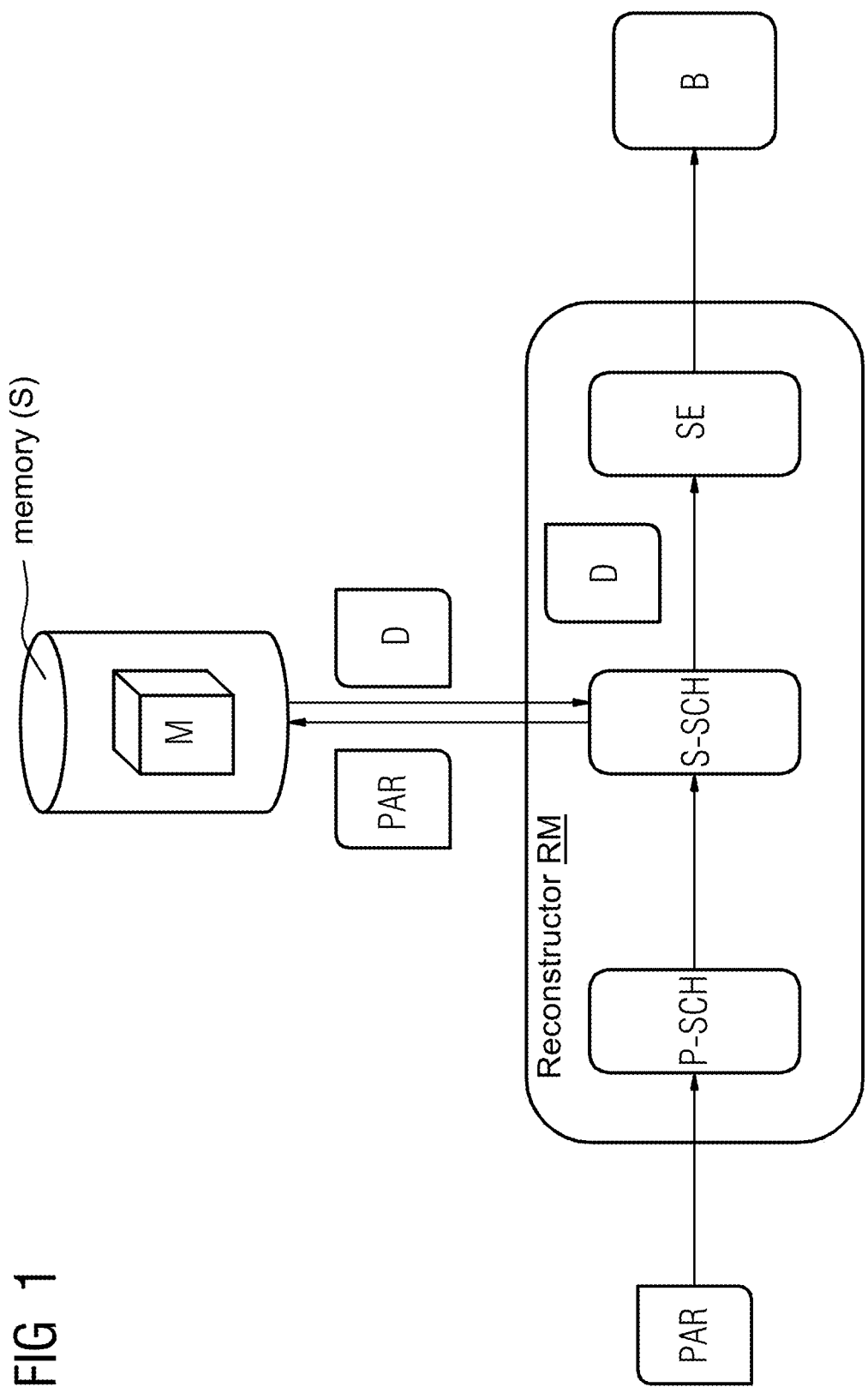
FIG. 1 shows a block diagram of the reconstruction module according to an exemplary embodiment of the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to provide an automatic parameterization for noise reduction and edge enhancement.

According to a first aspect, the disclosure relates to a reconstruction module for a magnetic resonance tomography scanner for the reconstruction of medical images. The reconstruction module has at least one parameter interface. The parameter interface is configured to receive a set of measurement sequence parameters. The measurement sequence parameters can be read out and/or provided automatically and are received via the parameter interface and provided to the reconstruction module for further processing. The reconstruction module further comprises a memory interface to a memory. The memory interface may comprise different protocols for communication with the memory. A trained mathematical model is stored in the memory. The memory may be embodied as a nonvolatile memory, e.g. as a flash memory (drive) or a hard disk drive. By means of the mathematical model, a results dataset containing at least one iterative denoising parameter and at least one edge enhancement parameter is determined for at least one received measurement sequence parameter. The reconstruction module additionally comprises a controller for controlling a reconstruction of the medical images by means of a first reconstruction algorithm using the determined parameters for parameterizing an iterative denoising function and an edge enhancement function. A processor configured to execute the first reconstruction algorithm may be embodied in the controller. In an exemplary embodiment, the controller includes processing circuitry that is configured to perform one or more operations/functions of the controller.

The present disclosure is based on the knowledge that there exists a demand for the automatic determination of the parameters relating to noise reduction and edge enhancement. Currently, no methods are known that automatically provide the corresponding values for parameterization. Rather, the operator is required to determine the necessary parameters on-the-fly.

It is advantageously possible by means of the present disclosure to determine a suitable parameterization, in particular an iterative denoising parameter and an edge enhancement parameter, while taking into account the received measurement sequence parameters for corresponding measurement sequences. For this purpose, it is no longer necessary for the operator a priori to perform the measurements in person in order to determine the parameters manually. It is furthermore of advantage that the mathematical model constitutes a mathematical rule by way of which any combination of measurement sequence parameters may be taken into account and processed. Using the determined iterative denoising parameters and edge enhancement parameters enables the values for the resolution and scanning speed of the magnetic resonance tomography scanner to be applied in a maximally optimized manner.

It is furthermore advantageous that the mathematical model can be subdivided into application-oriented strategies. In other words, depending on the medical diagnostic modality for which the medical image is to be used, the strategy may consist in optimizing the parameters for rapid measurement or high resolution or for a mixture of both.

Firstly, important concepts used in the present patent application need to be defined. What is to be understood by a sequence within the meaning of the present patent application is a general measurement specification. A sequence or measurement sequence defines how an image is to be captured, i.e. which acquisition parameters need to be determined. Approx. 50 sequences are available on an MR scanner, each of which is suitable for different clinical issues, e.g. a sequence for searching for tumors (=diffusion), one for searching for stenoses (=TOF), etc. What is to be understood by an acquisition parameter within the meaning of the present patent application is a single value that determines a single aspect of the measurement, e.g. timing parameters, such as TE, TR, TI or a specification relating to fat saturation (on/off). Furthermore, what is to be understood by a protocol is a set of acquisition parameters for a sequence. In other words, if the sequence specifies that acquisition parameters x, y, z are to be defined prior to the measurement, then the protocol comprises the actual instances of the parameters x=15, y=244, z=100. Other protocols can also be measured using the same sequence, e.g. x=30, y=500, z=120.

Within the scope of this disclosure, a distinction is made between two different categories of parameters:
  between measurement sequence parameters, and
  the parameters of the ID and EE procedures.

The measurement sequence parameters in this case form the basis for determining the parameters of the ID and EE procedure/function.

In an advantageous embodiment of the method, the measurement sequence parameters can be read out directly and efficiently extracted from the MR protocol. This relates in particular to the measurement sequence parameters field-of-view and SNR.

In a further advantageous embodiment, the measurement sequence parameters can be read out indirectly from an at least partially reconstructed image. This relates in particular to the measurement sequence parameter contrast. In addition to being determined directly, the SNR and/or anatomical region parameters may also be determined indirectly from the image and/or read out from a memory. The at least partially reconstructed image is generated by means of a second reconstruction algorithm. In this case, the second reconstruction algorithm applies no ID function and no EE function. From the partially reconstructed image, it is advantageously possible to determine parameters which cannot be provided without at least one partial reconstruction or, as the case may be, said parameters can be derived in a simple and efficient manner from the partially reconstructed image. For example, it can be determined which contrast between black and white results in the partially reconstructed image. It is furthermore possible to determine which SNR is present. Consequently, the parameters contrast and SNR can be determined for example from (at least partially) reconstructed images without using the ID (Iterative Denoising) function and EE (Edge Enhancement) function.

In a further advantageous embodiment of the reconstruction module, the measurement sequence parameter may comprise a contrast value. The contrast value describes the relative difference between the signal intensities in two adjacent areas of the medical image. The contrast in MRT is dependent on the property of the hydrogen protons in the tissue, in particular on how quickly these dephase or relax. In this regard, fluids or fats and organs with a high protein content can be visualized by dark or bright areas and thus be distinguished from one another. According to the disclosure, the contrast can be determined either directly from the protocol parameters or, as described above, in an image-based manner from an at least partially reconstructed image.

In a further advantageous embodiment of the reconstruction module, the measurement sequence parameter may comprise a field-of-view value. The field-of-view (FOV) value defines the size of the two- or three-dimensional spatial encoding area of the medical image. The field-of-view value may be specified by the user e.g. via the specification of the length of the edges, i.e. an FOV of 220 mm×190 mm can be specified for a 2D image, for example. For 3D measurements, 220 mm×190 mm×110 mm can be specified, for example. The FOV is the rectangular image area that contains the object to be measured, an organ for example. The FOV value can also be simply drawn in by dragging a rectangle on a graphical user interface to form a scout or "overview image". Furthermore, the matrix size of the measurement is specified by the user, for example 128×128 measurement points for a 2D measurement. The resolution/voxel size is then computed from the FOV and the matrix size. To reduce the sampling time, a field of view is useful which is different in frequency and phase encoding direction (rectangular field of view (RFOV)). The magnetic field homogeneity decreases, the more tissue is imaged (larger FOV). As a consequence, the precession frequencies change over the imaging volume, which can lead to problems in imaging with certain organs. According to the disclosure, the parameters for the ID function and for the EE function of the reconstruction are therefore selected efficiently on the basis of the field-of-view value for the organ that is to be imaged. Furthermore, the correct choice of the FOV improves the quality of the medical image.

In a further advantageous embodiment of the reconstruction module, the measurement sequence parameter may comprise an anatomical region parameter which indexes the body region to be examined. The anatomical region parameter may be selected and set e.g. during the patient registration by means of a controlled identification and/or from a patient database.

In a further advantageous embodiment of the reconstruction module, the measurement sequence parameter may comprise a signal-to-noise ratio. The SNR is used in MRT in order to describe the relative contributions of the true signal and randomly overlaid signals ("background noise") to a detected signal and therefore represents a criterion for the image quality. In order to increase the SNR, an average can be formed from multiple measurements of the signal in the expectation that random contributions will tend to cancel one another out. The SNR can also be improved by sampling larger volumes (increasing the size of the field of view and the slice thickness with corresponding loss of spatial resolution) or, within limits, by increasing the strength of the magnetic field used.

In a further advantageous embodiment, the reconstruction module may therefore comprise an averaging parameter of the measurement sequence parameters. In particular, the measurement sequence parameter comprises the number of averagings. The SNR can be influenced via the value of the averagings. In particular, the SNR can be improved by increasing the number of averagings (NS=Number of Scans). Taking the averaging into account, a value for the necessary measurement time, which is proportional to the number of averaged scans, is also yielded.

As already described above, certain measurement sequence parameters can also be extracted directly from the measurement sequence (i.e. without a prior partial image reconstruction). Thus, in particular the contrast value can be extracted from the measurement sequence parameters echo time (TE) and/or repetition time (TR). The repetition time denotes the time that elapses in MRT between two excitation pulses. The T1 weighting can be determined by an appropriate choice of the parameter. The echo time denotes the time interval between the excitation and the measurement of the MR signal. The T2 weighting of a magnetic resonance tomography scanner can be specified by the choice of echo time.

In a further advantageous embodiment of the reconstruction module, the determined results dataset comprises a computed combination composed of the ID parameter for denoising (ID) and the EE parameter for edge enhancement (EE). The reconstruction of the medical image is activated and ultimately carried out using the computed combination of ID noise reduction parameter and EE edge enhancement parameter.

In a further advantageous embodiment of the reconstruction module, the trained mathematical model comprises a decision tree. The decision tree is a machine learning (ML) method and can be represented in the form of an ordered or directed tree which is used to visualize decision rules. Hierarchically sequenced decisions are represented by way of the graphical visualization in a tree diagram. The decision tree is trained and generated by means of a machine learning (ML) algorithm. Knowledge can be extracted automatically from the generated decision tree. A decision tree is created and optimized or trained afresh for each body region to be examined and for each contrast. Advantageously, it is only necessary to perform this operation once. The decision tree is optimized/trained using measurement sequence parameters and the associated results dataset containing at least one iterative denoising parameter and at least one edge enhancement parameter in such a way that a results dataset can be derived directly by way of the decision tree from any arbitrary set of measurement sequence parameters. In an embodiment, the datasets used for the training are chosen in such a way that they cover the whole range of clinical scenarios. Contrast, field-of-view values, body region to be examined, averagings, and SNR are provided as measurement sequence parameters for optimizing/training the decision tree.

In an embodiment, the decision tree can be optimized for the parameter resolution. On account of the physical relationships, it is known that the resolution behaves proportionally to the noise. If a higher resolution is chosen, the noise increases proportionally to the resolution. This physical relationship can be taken into account in the optimization of the decision tree.

In a further embodiment, physical and/or MR-specific relationships can be taken into account in order to create the decision tree. For example, the relationship between SNR and the iterative denoising parameter can be taken into account as follows. Given a high SNR in the image, there is little background noise, so the threshold value of the iterative denoising algorithm must be set low. In the case of a low SNR, the threshold value can and must be set higher.

The relationship between contrast and the edge enhancement parameter can also be taken into account. In an image having high contrast, the differentiation of the edges is of advantage, as otherwise the image appears unsharp to a user. A strong edge enhancement can therefore be applied in this case. In an image having low contrast, on the other hand, there are fewer edges and more continuous intensity curves. A less strong edge enhancement is necessary in this case.

For training purposes, sequences having generally high contrast (principally T2, TOF, diffusion, FLAIR) and sequences having low contrast (principally PD, T1, SWI) can be provided. There are also parameters that increase the contrast when they are selected (principally fat saturation, inversion, recovery, etc.).

In a further embodiment, the slice thickness and matrix size, timing parameters (for example TE, TR, possibly TI), the sequence type used (for example spin echo sequence, inversion recovery sequence (e.g. fat saturation), gradient echo sequence, etc.) can additionally be taken into account. A broad coverage of the parameters to be used for an MRT scan is achieved by this means.

Following the training of the decision tree, an optimization algorithm can be applied, e.g. a random forest algorithm based on multiple decision trees. The data necessary for the improvement may be derived for example from the methods used for MRT development or for quality assurance. Here, the random forest algorithm specifies rules governing how the many different decision trees are to be generated and subsequently combines them with the aid of a special ensemble method in order to achieve an overall result. Which properties and decision criteria the individual decision trees use to reach their results is based on a random principle and differs from decision tree to decision tree.

In an alternative embodiment of the reconstruction module, the trained mathematical model may comprise a trained artificial neural network (ANN). Neural networks may be used for classification, cluster detection or regression. Generally, neural networks consist of a plurality of nodes, connected via weighted edges, which interfere with one another in a previously defined manner and to which a specific input (measurement sequence parameter) is supplied in order to obtain a desired result (results dataset with ID parameter and EE parameter). The structure and/or the parameters of the network can be determined in a learning/training phase. In order to train the network, e.g. a gradient descent method can be applied until the neural network achieves the desired result(s). Using a neural network has the advantage that the individual measurement sequence parameter mappings of reality can be learned. Furthermore, the measurement sequence parameters require no ordering and/or structure. No limiting of dimensionality is given by the neural network. The necessary computing power and the memory requirement for the calculation of the neural network can be controlled by way of the number of measurement sequence parameters used. Furthermore, the neural network can be retrained and/or trained further during use by means of the evaluated data, thereby enabling the results dataset containing at least one iterative denoising parameter and at least one edge enhancement parameter to be determined with greater accuracy and precision.

The trained artificial neural network may be embodied as a deep neural network (DNN) and in particular comprise a convolutional neural network (CNN). A deep neural network is a neural network consisting of at least two layers, preferably of more than two layers. Deep neural networks use a mathematical model in order to process data in a complex manner. Deep neural networks are trained for a specific technical problem, such as in particular e.g. the pattern recognition of measurement sequence parameters and ID and EE parameters. A neural network comprises an input layer, an output layer and at least one hidden layer between the input layer and the output layer. Each layer performs specific types of sorting and archiving of data. Neural networks are suitable in particular for processing unmasked and/or unstructured data. A convolutional neural network (CNN) is a multilayer image processing unit comprising convolutional, pooling and rectified linear units (ReLU layers). These layers may be arranged in any order as long as they conform to the input size and output size criteria.

In an alternative embodiment of the reconstruction module, the trained mathematical model may comprise a value lookup table. A value for the ID noise reduction parameter and a value for the EE edge enhancement parameter can be calculated from the lookup table. A grid of measurement sequence parameters can be stored by means of the lookup table. The measurement sequence parameters can be defined statically by way of the lookup table and used at program runtime in order to avoid compute-intensive calculations or high memory consumption. A precalculated/determined results dataset containing at least one iterative denoising parameter and at least one edge enhancement parameter is defined and stored in the associated lookup table for specific constellations of measurement sequence parameters. The individual entries in a lookup table can be identified and addressed by way of a search term of a column or via a position. In the evaluation of the lookup table, interpolations are carried out between the neighboring entries. Each entry contains correspondingly predefined information. By means of the lookup table, complex calculations can be replaced at program runtime by a generally fast value search. By using lookup tables there is also no need for prior knowledge. The tables are instantaneously ready to be used as soon as entries are present. In an embodiment, the lookup table can be generated from a decision tree. At the time of execution/processing of the decision tree, a path is produced from which a lookup table can advantageously be determined.

In a further advantageous embodiment of the reconstruction module, the trained mathematical model was trained by means of a supervised learning method using labeled datasets comprising measurement sequence parameters and associated optimal results datasets. By means of the supervised learning method using datasets containing a measurement sequence parameter and the corresponding optimal results dataset, the correctness of the machine-generated assignment is immediately reflected back to the learning algorithm. To this end, all the training data is provided with the optimal results dataset as label. Accordingly, the optimal EE parameters and ID parameters to be used can advantageously be learned with the aid of examples.

In a further advantageous embodiment of the reconstruction module, the trained mathematical model was trained by means of an unsupervised learning method. By means of the unsupervised learning method, it is attempted to identify structures and differences in the data (measurement sequence parameters and associated results dataset) in order to find groups (clusters) of similar examples. On the basis of the most important clusters, it is possible to learn to assign (classify) the examples to the corresponding clusters in accordance with their properties.

In a further advantageous embodiment of the reconstruction module, the trained mathematical model was trained by means of a partially supervised learning method, in particular a semi-supervised learning method. This represents a compromise between supervised and unsupervised learning. In this case, not all the training data is provided with a result in the form of a label. This enables the labeling overhead to be minimized. By a combination of clustering and classification, the training data without labels can be used for the training. For this purpose, a clustering algorithm is applied first and then the few examples present with labels are used in order to assign the cluster, and hence all examples of the cluster, to a class.

In a further advantageous embodiment of the reconstruction module, the mathematical model is optimized for accelerated measurement by way of an acquired optimization parameter. The optimization parameter can be acquired e.g. via a field on an interface on the reconstruction module. In this regard, the reconstruction module comprises an interface for communication with the MRT system or with the operator. The decision tree can be optimized for accelerated execution in accordance with a chosen strategy, preferably selected by the operator.

In a further advantageous embodiment of the reconstruction module, the mathematical model is optimized for high spatial resolution of the images by way of an acquired optimization parameter. In a further decision tree, the focus can be placed on an optimization of the spatial resolution of the images (higher resolution) for the same measurement time in accordance with a further chosen strategy. In this regard, a different optimized iterative denoising parameter is provided by means of the present disclosure than in the optimization for an accelerated measurement.

In a further advantageous embodiment of the reconstruction module, the memory is embodied as a local memory in the reconstruction module. The memory may be embodied as a nonvolatile memory, for example a flash memory and/or a hard disk drive.

In an alternative embodiment of the reconstruction module, the memory is embodied as a central memory in a server/cloud system. The reconstruction module comprises a communications interface for communication with the central memory. The memory may be embodied as a nonvolatile memory, for example a flash memory and/or a hard disk drive.

In a further advantageous embodiment of the reconstruction module, the latter embodies a processor for executing at least one reconstruction algorithm. In particular, the processor is embodied to execute a first and second reconstruction algorithm.

A further aspect of the present disclosure comprises a computer-implemented method for reconstruction of medical images. The method comprises the following method steps:
  receiving a set of measurement sequence parameters;
  determining a results dataset containing at least one iterative denoising parameter and at least one edge enhancement parameter by means of a trained mathematical model on the basis of the received set of measurement sequence parameters.

A further method step is provided in an advantageous embodiment of the method. The method step comprises an activation of the reconstruction of the medical images by means of the reconstruction algorithm using the determined parameters for parameterizing an iterative denoising function and an edge enhancement function.

The solution to the problem has been described in the foregoing with reference to the method according to exemplary embodiments. Features, advantages or alternative embodiments mentioned in relation thereto may equally be applied also to the other aspects of the disclosure, and vice versa. In other words, the physical entity claims (which are directed for example to a system or a computer program product) may also be developed using the features described and/or claimed in connection with the method, and vice versa. The corresponding functional features of the method are in this case embodied by corresponding physical entity modules, in particular by hardware modules (e.g. circuitry) or microprocessor modules, of the system or product, and vice versa.

The inventive embodiment variants of the method according to the disclosure described in the foregoing may also be embodied as a computer program, wherein a computer is prompted to perform the above-described inventive method when the computer program is executed on a computer or, as the case may be, on a processor of the computer, preferably of the controller. The computer program may be provided as a signal by download or be stored in a memory unit of the computer with computer-readable program code contained therein in order to prompt the computer to execute instructions according to the above-cited method. In this case, the computer program may also be stored on a machine-readable storage medium. An alternative solution to the problem provides a storage medium that is intended for storing the above-described method and is readable by a computer or processor.

A further aspect of the present disclosure comprises a system for the reconstruction of medical images. The system comprises a magnetic resonance tomography scanner for the acquisition of detector signals for the reconstruction of medical images. The magnetic resonance tomography scanner comprises a computer having at least one processor configured to execute a software package. The software package may contain a reconstruction module comprising reconstruction software, as described hereinabove. The system additionally comprises a memory in which a trained mathematical model is stored.

FIG. 1 shows a block diagram of the reconstruction module according to an exemplary embodiment of the disclosure. The reconstruction module RM shown in FIG. 1 comprises at least one parameter interface P-SCH. The parameter interface P-SCH is configured to receive a set of measurement sequence parameters PAR. What is understood by an MRT measurement sequence is an electronic pulse sequence that is executed on the magnetic resonance tomography scanner in order to generate detector signals, from which images are reconstructed by means of a reconstruction algorithm. Such a pulse sequence may comprise e.g. specific radiofrequency and gradient pulses that are repeated multiple times during a scan. Signals are received in the short time interval between the pulses and automatically evaluated (reconstruction algorithm) by way of a computer R (cf. FIG. 3) in order to compute medical images B. The pulse sequence is described by means of a set of measurement sequence parameters, e.g. the repetition time (TR), echo time (TE), possibly inversion time (TI—in inversion recovery). The cited parameters are variable. Accordingly, there are a large number of different MRT sequences. All the sequences deliver different images with different information. Depending on the clinical issue, the correct MRT sequence or multiple meaningful sequences must be chosen by the operator. There is a series of common standard sequences that are mostly used. Examples include spin echo (SE), FLAIR, gradient echo (GRE), etc.

The reconstruction module RM embodies a memory interface S-SCH to a memory S. The received measurement sequence parameters PAR can be transferred to the memory S via the memory interface S-SCH. The measurement sequence parameters PAR comprise at least values for the field of view (FOV), averagings, SNR, contrast and/or body region. The measurement sequence parameters PAR may also comprise values for the slice thickness & matrix size, timing parameters (TR, TE, TI), sequence type and/or fat saturation (yes/no).

A trained mathematical model M is stored in the memory S. For storing the model M, the memory S may be embodied as a nonvolatile flash memory and/or as a hard disk drive. In an embodiment, the memory S may be embodied as a local component of the reconstruction module RM in the computer R. In an alternative embodiment, the memory may be embodied as a central memory S in a server cluster and/or in a cloud storage. This has the advantage that multiple magnetic resonance tomography scanners T (cf. FIG. 3) can access said memory S via a communications link and can use said trained mathematical model M for corresponding applications according to the present disclosure.

The trained mathematical model M is configured to determine a results dataset D for at least one received measurement sequence parameter PAR. The results dataset D comprises at least one iterative denoising parameter ID-PAR and at least one edge enhancement parameter EE-PAR (not shown). In an exemplary embodiment, the trained mathematical model M may comprise a decision tree. In an alternative embodiment, the trained mathematical model M may comprise a trained artificial network (ANN), embodied as a deep neural network (DNN), in particular comprising a convolutional neural network (CNN). In a further alternative embodiment, the mathematical model M may comprise a lookup table. It may also be provided that different mathematical models M are provided in parallel for complementary or verification purposes. The mathematical model M can be trained by means of a supervised learning method using labeled datasets comprising measurement sequence parameters PAR and associated optimal results datasets D. Alternatively, it can be provided to train the mathematical model M by means of an unsupervised or partially supervised learning method.

In an embodiment, the mathematical model M can be optimized using an acquired optimization parameter for an accelerated measurement and/or high spatial resolution of the medical images B. The acquired optimization parameter constitutes a parameter which can be provided prior to the measurement and/or prior to a further reconstruction via an interface on the magnetic resonance tomography scanner T (e.g. input by the user on a UI).

In an embodiment, the mathematical model M can be trained and optimized further dynamically during the application. For example, an operator of the magnetic resonance tomography scanner T can overwrite the determined parameters EE-PAR, ID-PAR, since a medical image B possibly does not meet the desired clinical requirements following the reconstruction using the determined parameters. In particular, it can be assessed whether the determined parameters were rejected or overwritten by the operator. From this it can be concluded that the learned results dataset D for the corresponding measurement sequence parameters PAR does not fulfill the clinical requirements for medical images B. Said results dataset D can for example be blocked, overwritten and/or marked for validation (for example by a testing service).

A controller SE may additionally be provided in the reconstruction module RM. The controller SE is configured to control a reconstruction of the medical images B using the determined parameters EE-PAR, ID-PAR for the parameterization, in particular for the automatic parameterization of an iterative denoising function and an edge enhancement function. In a further embodiment, the reconstruction module RM may embody a processor for executing a reconstruction algorithm, in particular the first and second reconstruction algorithm. Using the iterative denoising function and the edge enhancement function and the determined parameters it is possible to control automatically, for each body region to be examined and each contrast, how strong the denoising is to be, and how strongly the edges are to be enhanced.

In a further embodiment, the determined parameters EE-PAR, ID-PAR are provided to an operator of the magnetic resonance tomography scanner T via an operator interface, for example a monitor, as a suggestion for the reconstruction that is to be performed. The operator is afforded the possibility of rejecting the determined parameters and overwriting them with a standard parameterization, of manually modifying the determined parameters according to corresponding requirements, or of verifying and confirming the determined parameters.

Figure 2:
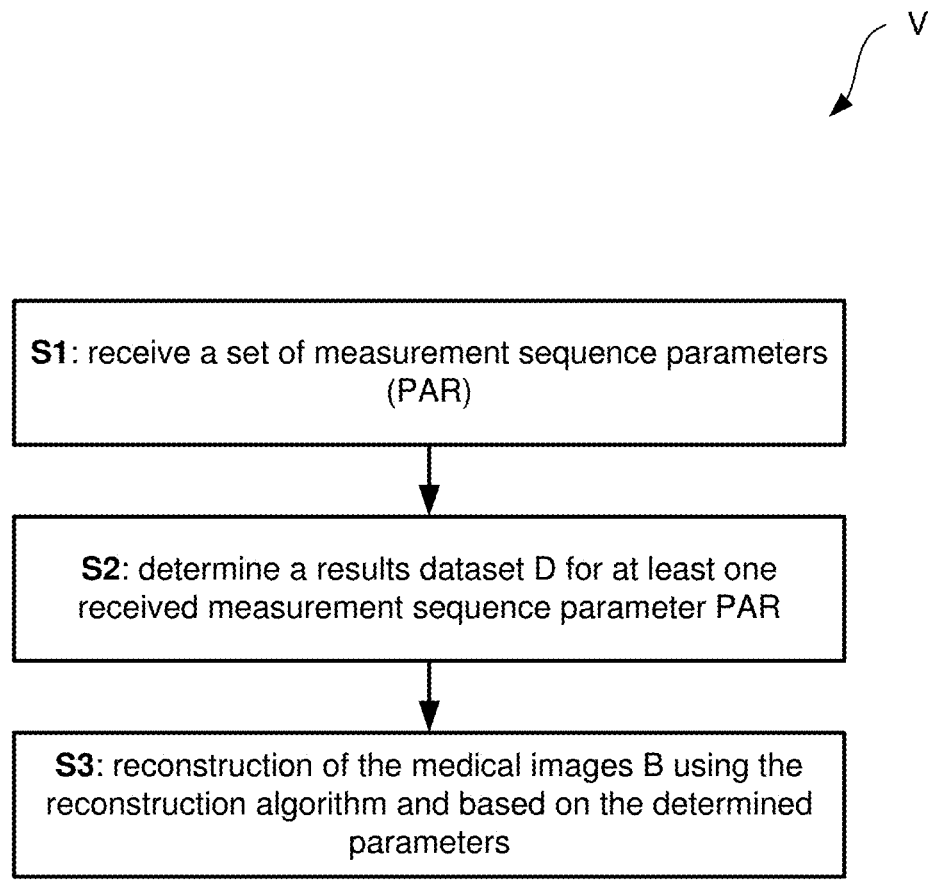
FIG. 2 shows a flowchart of a method according to an exemplary embodiment of the disclosure.

FIG. 2 shows a flowchart of a method according to an exemplary embodiment of the disclosure. In the embodiment shown, the method V comprises multiple method steps. In a first step S1, a set of measurement sequence parameters PAR is received. In a second step S2, a results dataset D is determined for at least one received measurement sequence parameter PAR. The results dataset D comprises at least one iterative denoising parameter ID-PAR and at least one edge enhancement parameter EE-PAR. The results dataset D is determined by means of a trained mathematical model M. The determined results dataset D can be used in a reconstruction algorithm for reconstructing medical images B. In the embodiment shown, the method V comprises a third method step S3. In the third method step S3, the reconstruction of the medical images B is activated by means of the reconstruction algorithm using the determined parameters EE-PAR, ID-PAR for parameterizing an iterative denoising function and an edge enhancement function.

Figure 3:
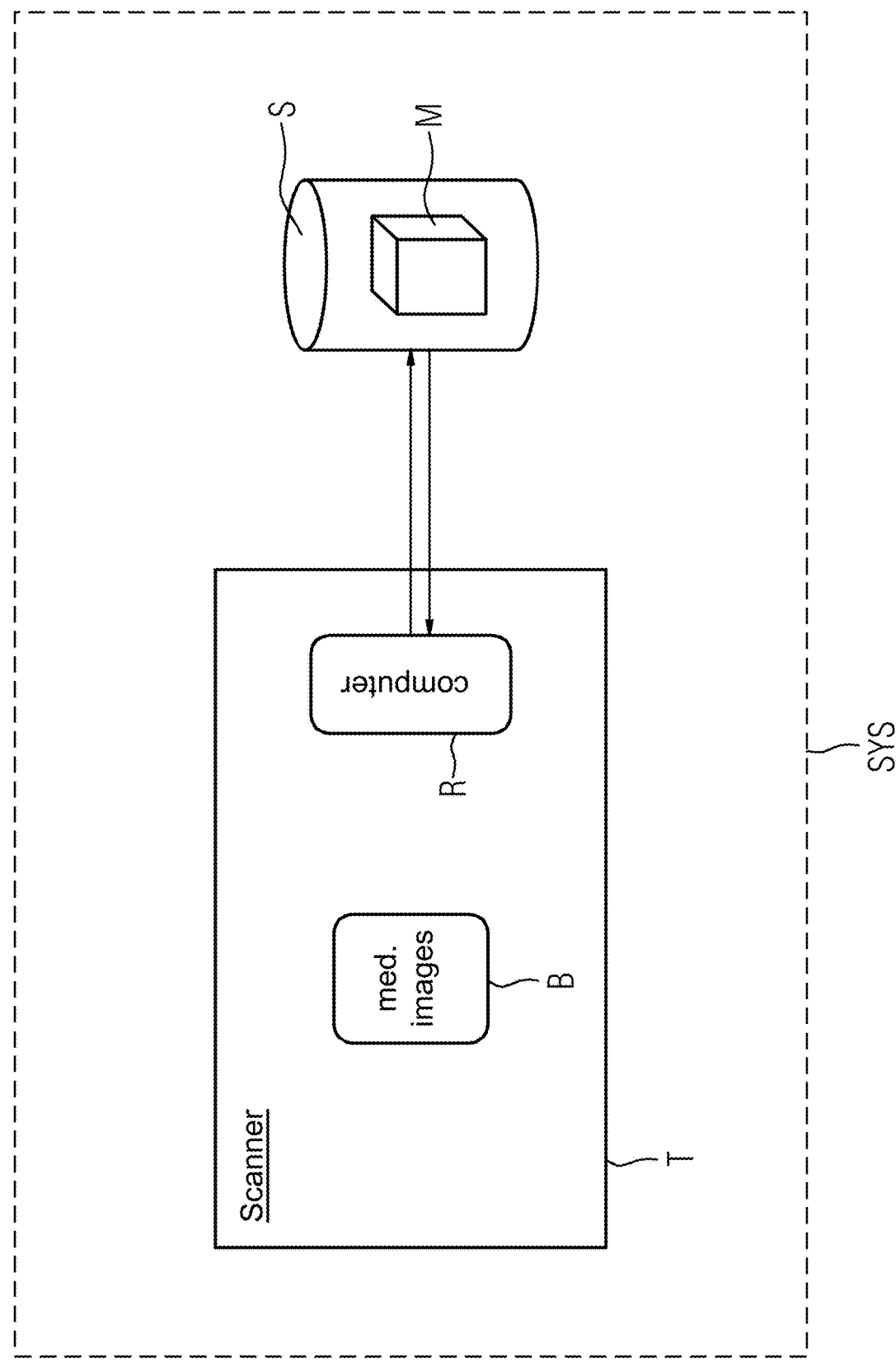
FIG. 3 shows a block diagram of a system according to an exemplary embodiment of the disclosure.

FIG. 3 shows a block diagram of a system according to an exemplary embodiment of the disclosure. In the embodiment shown, the system SYS comprises a conventional magnetic resonance tomography scanner T. The magnetic resonance tomography scanner T can be operated and controlled by an operator via an operator interface (not shown). Instructions to a computer R can be provided via the operator interface for the purpose of controlling the magnetic resonance tomography scanner T. The magnetic resonance tomography scanner T is configured to acquire detector signals for the reconstruction of medical images B. The computer R may comprise at least one processor P (not shown) configured to execute a software package. The computer R may be installed locally in association with the magnetic resonance tomography scanner T (as is intended to be indicated in FIG. 3) or may be embodied in the form of an external, separate reconstruction computer (not shown). The computer R may also be hosted on a server cluster and/or in the cloud. In this regard, the magnetic resonance tomography scanner T has corresponding communications links for data interchange and/or data transport. The software package may comprise a reconstruction module RM having reconstruction software according to the present disclosure. The reconstruction module RM may be stored and executed as an individual module or be stored and executed distributed over a plurality of modules. The system SYS further comprises a memory S, which is embodied as a nonvolatile flash memory and/or hard disk drive. The memory S communicates with the computer R via a communications interface. A trained mathematical model M is stored in the memory S. In an exemplary embodiment, the computer R includes processing circuitry configured to perform one or more functions/operations of the computer R.

Figure 4:
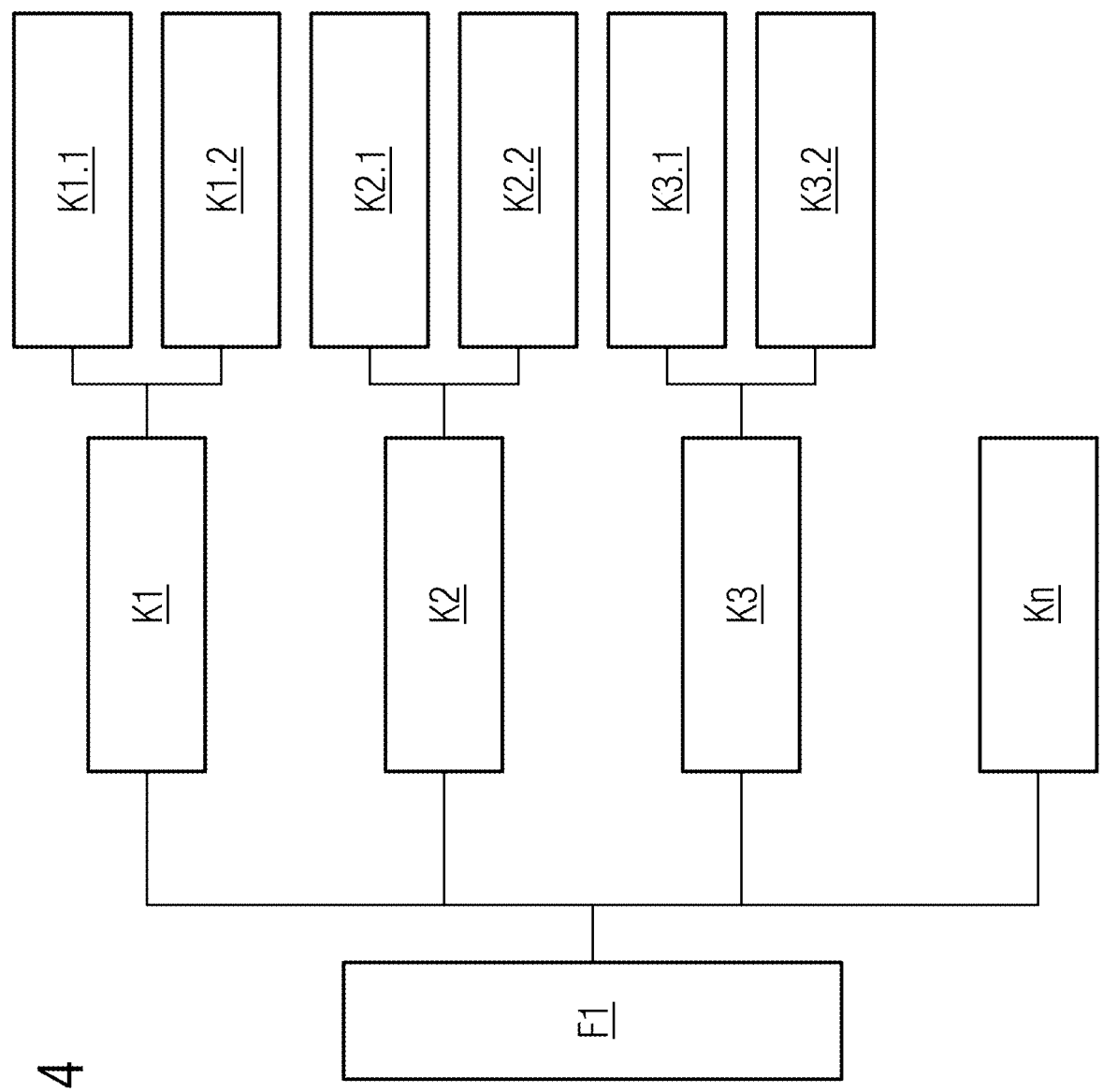
FIG. 4 shows a first block diagram of a decision tree according to an exemplary embodiment of the disclosure.

FIG. 4 shows a first block diagram of a general decision tree according to an embodiment of the disclosure. In FIG. 4, starting from the field strength F1 and the body region to be examined K1, K2, K3, Kn, the focus can be placed on the resolution K1.1, K2.1, K3.1 of the medical images B or on the acceleration K1.2, K2.2, K2.3 of the measurement. For example, in an examination of the body region K1 (head), the parameters EE-PAR, ID-PAR may be chosen such that the focus is laid on a high resolution K1.1 or on high acceleration K1.2. In a further examination of the body region K2 (abdomen), the parameters EE-PAR, ID-PAR may be chosen such that the focus is on a high resolution K2.1 or on high acceleration K2.2. In a further examination of the body region K3 (heart), the parameters EE-PAR, ID-PAR may be chosen such that the focus is on a high resolution K3.1 or on high acceleration K3.2. What is to be understood by "be chosen" is a determining of the parameters using a trained mathematical model M based on received measurement sequence parameters PAR. The illustrated enumeration is not to be regarded as exhaustive for the use of the reconstruction module.

Figure 5:
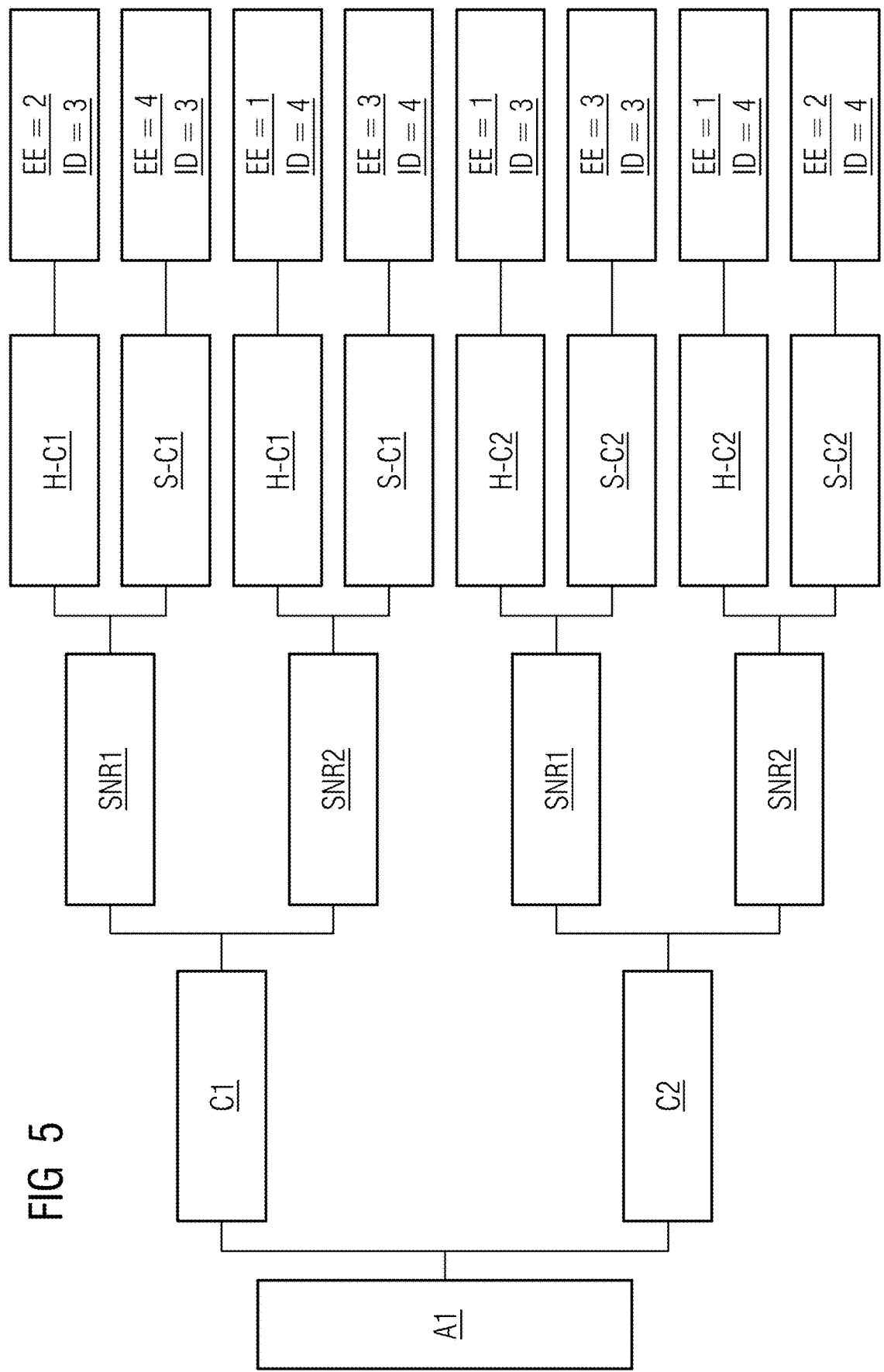
FIG. 5 shows a second block diagram of a decision tree according to an exemplary embodiment of the disclosure.

FIG. 5 shows a second block diagram of a decision tree according to an embodiment of the disclosure. If, for example, different contrasts are measured by way of a TSE sequence, different settings for the denoising and the edge enhancement are required in order to achieve an optimal (visual) result. In a PD-weighted image (PD=Proton Density), a relatively "flat" image is produced in most body regions, i.e. there are only "minor" edge steps and more likely gradual variations in brightness. In this case, less denoising and also only a minor edge enhancement will be applied as otherwise the medical image B comes across as artificial. The exact opposite is when an IR (Inversion Recovery) measurement is performed. In most cases this is intended to "null" the signal of at least one tissue type. Thus, e.g. in the case of the sequence type FLAIR, the fluid in the head can be suppressed. In this case, the image contrast has significantly stronger edge steps and the gradual transitions play a more minor role. Stronger denoising must be provided here, and stronger edge enhancement must also be implemented. For this case, the decision tree is trained such that it detects from the TSE acquisition parameters whether the scan involves an IR/FLAIR measurement and will return correspondingly strong or weak parameters. The detection can be determined from the parameters TI, TR and TE, for example. Typical combinations of the three values that characterize an IR measurement are available for this purpose. If TI=ln(2)*T1 of CSF (the cerebrospinal fluid) is set, TR is long and TE short, then the sequence type is FLAIR. The value is then dependent in turn on the field strength, since the T1 of CSF is different for 1.5 T and 3 T. If TR>3*T1 of gray and white brain matter and TE is short, then it is a PD contrast. In the example shown in FIG. 5, the focus of the reconstruction lies in a high resolution A1 of the medical images B. For this purpose, it is determined whether a strong contrast C1 or a low contrast C2 is present. The contrast C1, C2 is dependent on the sequence type, the value for the contrast determined from the reconstructed image and/or the respective timing parameters TI, TR, TE (gradually in each case). A strong contrast C1 may be present for example in the case of the sequence types T2, TOF, diffusion, FLAIR. A low contrast C2 may be present for example in the case of the sequence types PD, T1, SWI. The SNR (SNR) is determined based on the contrast C1, C2. The SNR can be determined via the coils of the magnetic resonance tomography scanner T, averagings, TE, TR. Alternatively, the SNR can also be determined indirectly from the reconstructed images. A high SNR SNR1 or an average SNR SNR2 can be determined for the SNR. Next, the contrast-to-noise ratio can be determined/taken into account. This is determined taking into account the fat saturation/inversion, recovery, subtraction. A high SNR SNR1 may exhibit an increased contrast-to-noise ratio H-C1, H-C2 or a standard contrast-to-noise ratio S-C1, S-C2. According to the contrast-to-noise ratio H-C1, H-C2, S-C1, S-C2, values are specified for the iterative denoising parameters ID-PAR ID and the edge enhancement parameters EE-PAR EE and are used for controlling the reconstruction of the medical images B by means of a first reconstruction algorithm. The values shown for the parameters represent example values and are not limited to these. In the embodiment shown, the value=1 is equivalent to a low value and the value=5 to a high value.

Figure 6:
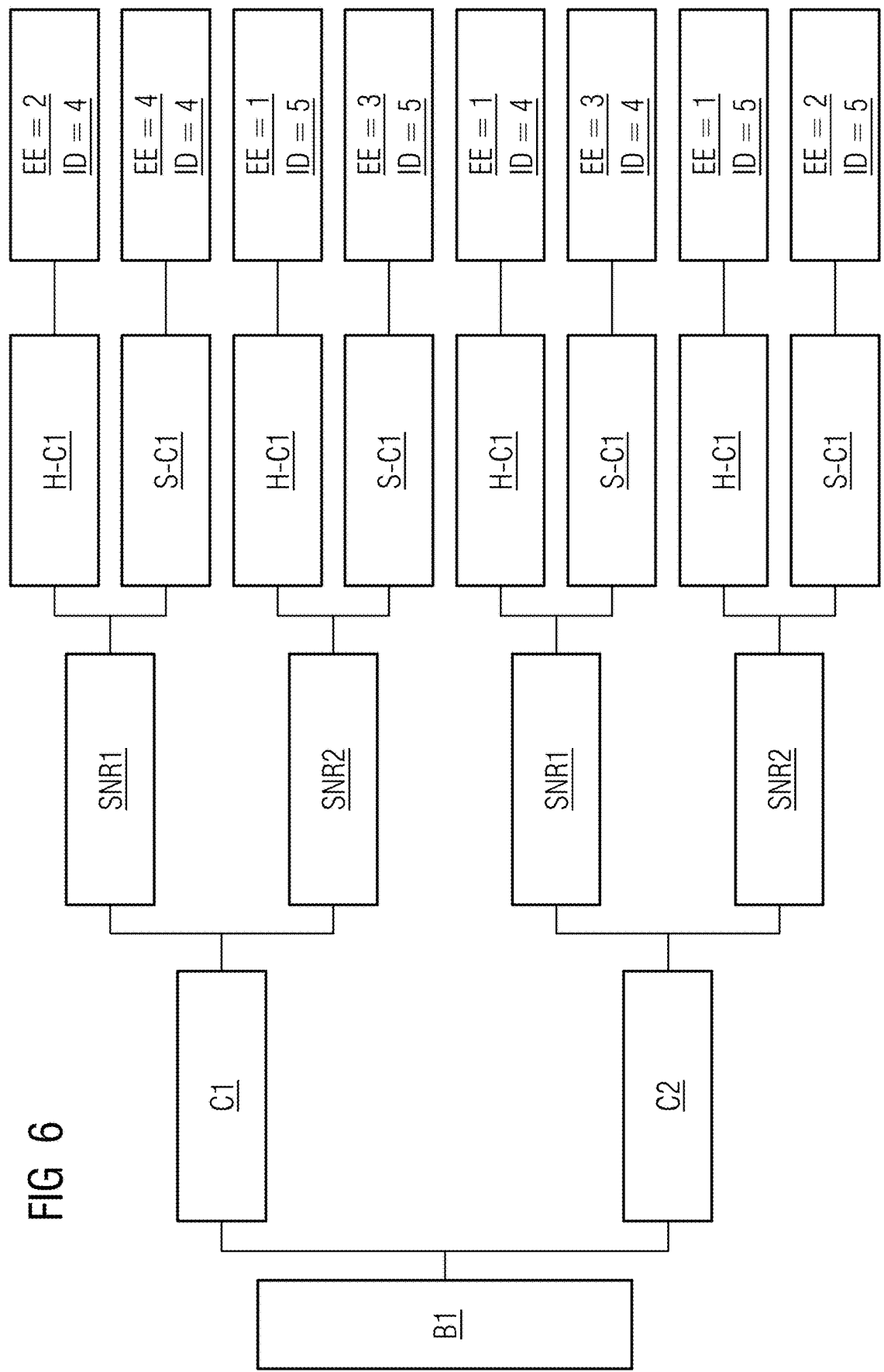
FIG. 6 shows a third block diagram of a decision tree according to an exemplary embodiment of the disclosure.

FIG. 6 shows a third block diagram of a decision tree according to an embodiment of the disclosure. In the example illustrated in FIG. 6, the focus of the reconstruction is on the acceleration B1 of the image acquisition. For this purpose, it is determined whether a strong contrast C1 or a low contrast C2 is present. The contrast C1, C2 is dependent on the sequence type, the value for the contrast determined from the reconstructed image and/or the respective timing parameters TI, TR, TE (gradually in each case). A strong contrast C1 may be present for example in the case of the sequence types T2, TOF, diffusion, FLAIR. A low contrast C2 may be present for example in the case of the sequence types PD, T1, SWI. The SNR (SNR) is determined based on the contrast C1, C2. The SNR can be determined via the coils of the magnetic resonance tomography scanner T, averagings, TE, TR. Alternatively, the SNR can also be determined indirectly from the reconstructed images. Consequently, the SNR is dependent on the coils/patient. A high SNR SNR1 or an average SNR SNR2 can be determined for the SNR. Next, the contrast-to-noise ratio can be determined/taken into account. This is determined taking into account the fat saturation/inversion, recovery, and subtraction. A high SNR SNR1 may exhibit an increased contrast-to-noise ratio H-C1, H-C2 or a standard contrast-to-noise ratio S-C1, S-C2. According to the contrast-to-noise ratio H-C1, H-C2, S-C1, S-C2, values are specified for the iterative denoising parameters ID-PAR ID and the edge enhancement parameters EE-PAR EE and are used for controlling the reconstruction of the medical images B by means of a first reconstruction algorithm. The values shown for the parameters represent example values and are not limited to these. In the embodiment shown, the value=1 is equivalent to a low value and the value=5 to a high value.

In conclusion, it should be pointed out that the description of the disclosure and the exemplary embodiments are basically to be understood as not limiting with regard to a particular physical implementation of the disclosure. All features explained and illustrated in connection with individual embodiments of the disclosure may be provided in different combinations in the inventive subject matter in order at the same time to realize their advantageous effects.

The scope of protection of the present disclosure is determined by the following claims and is not limited by the features explained in the description or shown in the figures.

It is in particular obvious for a person skilled in the art that the components of the reconstruction module may be realized separated into multiple components and/or distributed over multiple physical products.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A reconstruction computer for a magnetic resonance (MR) tomography scanner for the reconstruction of medical images, comprising:
a first memory storing a first reconstruction algorithm; and
processing circuitry configured to:
receive a set of measurement sequence parameters;
interface with a second memory having a trained mathematical model stored therein, the trained mathematical model being configured to determine a results dataset containing at least one iterative denoising (ID) parameter and at least one edge enhancement (EE) parameter for at least one received measurement sequence parameter, wherein the measurement sequence parameters are read out directly from an MR protocol and/or indirectly from an at least partially reconstructed image, the at least partially reconstructed image being generated using a second reconstruction algorithm that applies no ID function and no EE function; and
execute the first reconstruction algorithm to control a reconstruction of the medical images, based on the determined at least one ID parameter and the at least one EE parameter, to parameterize an iterative denoising function and an edge enhancement function.

2. The reconstruction computer as claimed in claim 1, wherein the measurement sequence parameters comprise:
a contrast value,
a field-of-view value,
a body region to be examined,
a number of averagings, and/or
a signal-to-noise ratio.

3. The reconstruction computer as claimed in claim 2, wherein
the contrast value is extracted from a measurement sequence and/or determined from a partially reconstructed image,
the field-of-view value and the averagings are extracted from a measurement sequence,
the signal-to-noise ratio is determined from the partially reconstructed image and/or read out from the second memory, and/or
the body region to be examined is determined from the second memory which stores a result of a registration for medical treatment.

4. The reconstruction computer as claimed in claim 1, wherein the determined results dataset comprises a computed combination composed of the at least one ID parameter for denoising and the at least one EE parameter for edge enhancement.

5. The reconstruction computer as claimed in claim 1, wherein the trained mathematical model comprises:
a decision tree;

a trained artificial neural network, embodied as a deep neural network including a convolutional neural network; and/or a lookup table.

6. The reconstruction computer as claimed in claim 5, wherein the trained mathematical model was trained by a supervised learning method using labeled datasets comprising measurement sequence parameters and associated optimal results datasets.

7. The reconstruction computer as claimed in claim 5, wherein the trained mathematical model was having been trained by an unsupervised or partially supervised learning method.

8. The reconstruction computer as claimed in claim 1, wherein the mathematical model is optimized by an acquired optimization parameter for accelerated measurement and/or high spatial resolution of the images.

9. The reconstruction computer as claimed in claim 1, wherein the second memory is embodied as a local memory in the reconstruction module.

10. The reconstruction computer as claimed in claim 1, wherein the second memory is embodied as a memory in an external system.

11. The reconstruction computer as claimed in claim 1, wherein the controller of the reconstruction module includes a processor configured to execute the first reconstruction algorithm.

12. A computer-implemented method for reconstruction of medical images, comprising:

receiving a set of measurement sequence parameters, wherein the measurement sequence parameters are read out directly from a magnetic resonance protocol and/or indirectly from an at least partially reconstructed image; and determining a results dataset using a trained mathematical model and based on the received set of measurement sequence parameters, the results dataset containing at least one iterative denoising (ID) parameter and at least one edge enhancement (EE) parameter, wherein the trained mathematical model is adapted for a reconstruction algorithm configured to reconstruct the medical images, the at least partially reconstructed image being generated using another reconstruction algorithm that applies no ID function and no EE function.

13. The method as claimed in claim 12, further comprising:

executing the reconstruction algorithm to reconstruct the medical images, based on the determined at least one ID parameter and the at least one EE parameter, to parameterize an iterative denoising function and an edge enhancement function.

14. A non-transitory computer-readable storage medium with an executable program stored thereon, that when executed, instructs a processor to perform the method of claim 12.

15. A system for the reconstruction of medical images, comprising:

a memory storing a trained mathematical model; and a magnetic resonance tomography scanner configured to acquire detector signals for the reconstruction of medical images, the magnetic resonance tomography scanner including a computer configured to engage in data interchange with the memory and having at least one processor configured to execute a first reconstruction algorithm to:

determine, using the trained mathematical model and based on measurement sequence parameters, a results dataset containing at least one iterative denoising (ID) parameter and at least one edge enhancement (EE) parameter for at least one received measurement sequence parameter, wherein the measurement sequence parameters are determined directly from a magnetic resonance protocol and/or indirectly from an at least partially reconstructed image generated using a second reconstruction algorithm that applies no ID function and no EE function; and reconstruct the medical images, based on the determined at least one ID parameter and the at least one EE parameter, to parameterize an iterative denoising function and an edge enhancement function.

* * * * *